(12) United States Patent
Wang et al.

(10) Patent No.: US 12,259,348 B2
(45) Date of Patent: Mar. 25, 2025

(54) MULTICHANNEL MATRIX-BASED ELECTROCHEMICAL TESTING SYSTEM

(71) Applicant: Automat Solutions, Inc., San Leandro, CA (US)

(72) Inventors: Xuejun Wang, Pleasanton, CA (US); Xiaoliang Wang, Alameda, CA (US)

(73) Assignee: Automat Solutions, Inc., San Leandro, CA (US)

( * ) Notice: Subject to any disclaimer, the term of this patent is extended or adjusted under 35 U.S.C. 154(b) by 456 days.

(21) Appl. No.: 17/548,484

(22) Filed: Dec. 10, 2021

(65) Prior Publication Data

US 2022/0120704 A1   Apr. 21, 2022

Related U.S. Application Data

(63) Continuation-in-part of application No. 17/204,858, filed on Mar. 17, 2021.

(60) Provisional application No. 63/040,133, filed on Jun. 17, 2020.

(51) Int. Cl.
  *G01N 27/07* (2006.01)
  *H01M 10/48* (2006.01)

(52) U.S. Cl.
  CPC .......... *G01N 27/07* (2013.01); *H01M 10/484* (2013.01)

(58) Field of Classification Search
  CPC .. G01N 27/07; H01M 10/484; H01M 50/598; G01R 31/56; G01R 1/20; G01R 31/385
  USPC ................ 324/425–439, 92, 500, 600, 76.11
  See application file for complete search history.

(56) References Cited

U.S. PATENT DOCUMENTS

| | | | | |
|---|---|---|---|---|
| 2002/0196518 A1* | 12/2002 | Xu | ...................... | G02F 1/15165 359/245 |
| 2004/0245100 A1* | 12/2004 | Abouatallah | ..... | H01M 8/04552 204/400 |
| 2006/0001430 A1* | 1/2006 | Kepler | .............. | H01M 8/04007 324/426 |
| 2012/0283964 A1* | 11/2012 | Berks | .................. | G01M 5/0033 702/38 |
| 2013/0010401 A1* | 1/2013 | Hosoe | .................... | H01G 9/145 429/211 |
| 2013/0061661 A1* | 3/2013 | Morel | ............... | H01M 10/4228 73/40.7 |
| 2022/0173443 A1* | 6/2022 | Profatilova | ....... | H01M 10/0565 |

(Continued)

*Primary Examiner* — Huy Q Phan
*Assistant Examiner* — Trung Q Nguyen
(74) *Attorney, Agent, or Firm* — Cognition IP, P.C.; Edward Steakley

(57) ABSTRACT

Methods, systems, and apparatuses for multichannel, matrix-based testing of electrochemical materials are described herein. The system provides an electrochemical testing apparatus that consists of a bottom block having a first array of N×M receiving wells, and a top block with a second array of N×M chambers, with each of the N×M chambers having an electrical connector. The method involves inserting, into a number of the first array of N×M receiving wells, one or more electrochemical compositions to be tested. The method then involves closing the top block onto the bottom block. When the top and bottom blocks are closed, the N×M receiving wells and N×M chambers are aligned, thereby forming N×M testing cells. Finally, the method involves measuring one or more properties of the electrochemical composition inserted in the plurality of the N×M receiving wells.

17 Claims, 14 Drawing Sheets

(56) References Cited

U.S. PATENT DOCUMENTS

| | | | |
|---|---|---|---|
| 2023/0142076 A1* | 5/2023 | Shaffer, II | H01M 4/14 29/623.2 |
| 2023/0378585 A1* | 11/2023 | Kim | H01M 10/48 |

* cited by examiner

FIG. 6B

Automat Switch Box

Service Unit: localhost:5000    ○ Port Connected ▾
Seconds to Next Batch: [  ]    ☐ Rotation

Channels

| ☐ CH-00 | ☐ CH-08 | ☐ CH-16 | ☐ CH-24 |
| ☐ CH-01 | ☐ CH-09 | ☐ CH-17 | ☐ CH-25 |
| ☐ CH-02 | ☐ CH-10 | ☐ CH-18 | ☐ CH-26 |
| ☐ CH-03 | ☐ CH-11 | ☐ CH-19 | ☐ CH-27 |
| ☐ CH-04 | ☐ CH-12 | ☐ CH-20 | ☐ CH-28 |
| ☐ CH-05 | ☐ CH-13 | ☐ CH-21 | ☐ CH-29 |
| ☐ CH-06 | ☐ CH-14 | ☐ CH-22 | ☐ CH-30 |
| ☐ CH-07 | ☐ CH-15 | ☐ CH-23 | ☐ CH-31 |

[ Reset ]
[ Next Batch ]
[ Previous Batch ]

MULTICHANNEL MATRIX-BASED ELECTROCHEMICAL TESTING SYSTEM

CROSS-REFERENCE TO RELATED APPLICATION

This application is a continuation-in-part of U.S. application Ser. No. 17/204,858, filed Mar. 17, 2021, which claims the benefit of U.S. Provisional Application No. 63/040,133, filed Jun. 17, 2020, the entire contents of which are hereby incorporated by reference.

This patent is supported by a national Science Foundation (NSF) grant for the Small Business Innovation Research Program (SBIR) Phase I project. The SBIR project name and number is: 2019 NSF SBIR Phase I FAIN 1938253: AI Robotics-driven Material Discovery Platform.

BACKGROUND

Conventional material research and development is mainly driven by human intuition, labor, and manual decision, which is often ineffective and inefficient. Due to the complexity of material design and the magnitude of experimental and computational work, the discovery of materials with conventional methods usually takes long development cycles and requires large human and financial costs.

In the discovery of battery materials like electrolyte, the properties of the material must be measured, such as, e.g., the conductivity and impedance of electrolyte material. This is to ensure that the material meets quality standards. The conventional way to measure such properties for electrolyte, for example, is to prepare a formulation with various powders and solvents, mix them together, and then process the formulation in different ways, such as by heating it. Once the electrolyte material is prepared, it is added to a coin cell battery, with the electrolyte typically placed between the electrodes of the battery. The properties of the coin cell battery can then be measured to see if the electrolyte material is of a sufficiently high-performing quality based on the conductivity of the material and other properties.

This conventional process for battery material formulation is a mainly single-channel manual process, and the material property testing involves serial-based measurement. As a result, this conventional process is very time-consuming, costly, and inefficient. A coin cell-based electrochemical testing process is usually lab-intensive and hard to integrate into a high-throughput testing model. Thus, there is a need in the field of art for a faster, more efficient, and less costly method of measuring the properties of electrochemical material.

SUMMARY

Further areas of applicability of the present disclosure will become apparent from the detailed description, the claims and the drawings. The detailed description and specific examples are intended for illustration only and are not intended to limit the scope of the disclosure.

Various embodiments described herein are directed to a system, an apparatus, and a method for electrochemical testing. The testing involved is multichannel and matrix-based and is capable of realizing battery material formulation and testing in a parallel high-throughput mode. In some embodiments, it includes a multichannel formulation and electrochemical testing module, a connection box such as, e.g., a clap on fast connection box, and an automatic switch box with control software. This system can mimic a matrix of N×M (such as, e.g., a 2×4 or 4×8 matrix) for the number of coin cells used for robotic formulation and automatic electrochemical property measurement. In some embodiments, this system is used to discover high-performance battery materials, including, e.g., electrolyte, cathode, anode, and battery devices.

A matrix-based, multichannel battery material formulation and testing system can be used to accelerate the research and development of battery material, as well as the time-to-market for products. In some embodiments, the testing system can be used for robotic high-throughput formulation and parallel electrochemical testing. In some embodiments, an automatic switch box can be employed to facilitate this. In some embodiments, the testing system functions to simplify the battery material discovery process, with higher efficiency and faster testing, and with less human involvement.

The traditional battery material (such as, e.g., electrolyte material) formulation is mainly based on a single formulation and is carried out by a battery scientist or technician, who prepares a pipette-dispensed liquid or manually weighed solid materials and adds them into bottles or vials. The formulated materials in the containers (e.g., bottles or vials) is then processed with heating, shaking, etc., and then the materials will be transferred manually to individual coin cells for property testing (conductivity, electrochemical impedance etc.). It is very labor intensive and time consuming, especially for formulating and testing a large number of different material compositions. Usually, a scientist can only formulate and test a few samples each week.

A matrix-based battery material formulation and testing system, combined with, e.g., a robotics driven system in some embodiments, can allow parallelizing many experiments at one time via automation, thus greatly compressing research time. In some embodiments, the system can perform formulation and testing from, e.g., 2 to 96 or more different compositions. This results in much faster throughput in the lab compared with the traditional approach to research and development.

In some embodiments, this testing involves an electrode combined with parallel processing of multiple (e.g., 20, 30, 40, or more) electrolyte materials such that they are all measured simultaneously, resulting in a much faster and more efficient method of testing. In some embodiments, the testing is performed with an electrochemical module consisting of an N×M matrix of testing cells for electrolyte composition to be placed.

One embodiment involves a method and system for electrochemical testing. The method provides an electrochemical testing apparatus that consists of a bottom block having a first array of N×M receiving wells, and a top block with a second array of N×M chambers, with each of the N×M chambers having a top electrical connector and a bottom electrical connector, i.e., a top electrode and a bottom electrode. Thus, each testing channel will have its own top and bottom electrodes. Each channel has two wires connected to the testing device. A top and bottom PCB board connect the 32 channels, and connect to a switch box. In one embodiment, the method involves inserting, into a number of the first array of N×M receiving wells, one or more electrochemical compositions to be tested. The method then involves closing the top block onto the bottom block. When the top and bottom blocks are closed, the N×M receiving wells and N×M chambers are aligned, thereby forming N×M testing cells. Finally, the method involves measuring one or more properties of the electrochemical composition inserted in the plurality of the N×M receiving wells.

Additional features and advantages will be set forth in the description which follows, and in part will be implicit from the description, or may be learned by the practice of the embodiments.

BRIEF DESCRIPTION OF THE DRAWINGS

The present disclosure will become better understood from the detailed description and the drawings, wherein:

FIG. 6B illustrates an exemplary embodiment of a control software interface for an automatic switch box, according to some embodiments.

DETAILED DESCRIPTION

Figure 1:
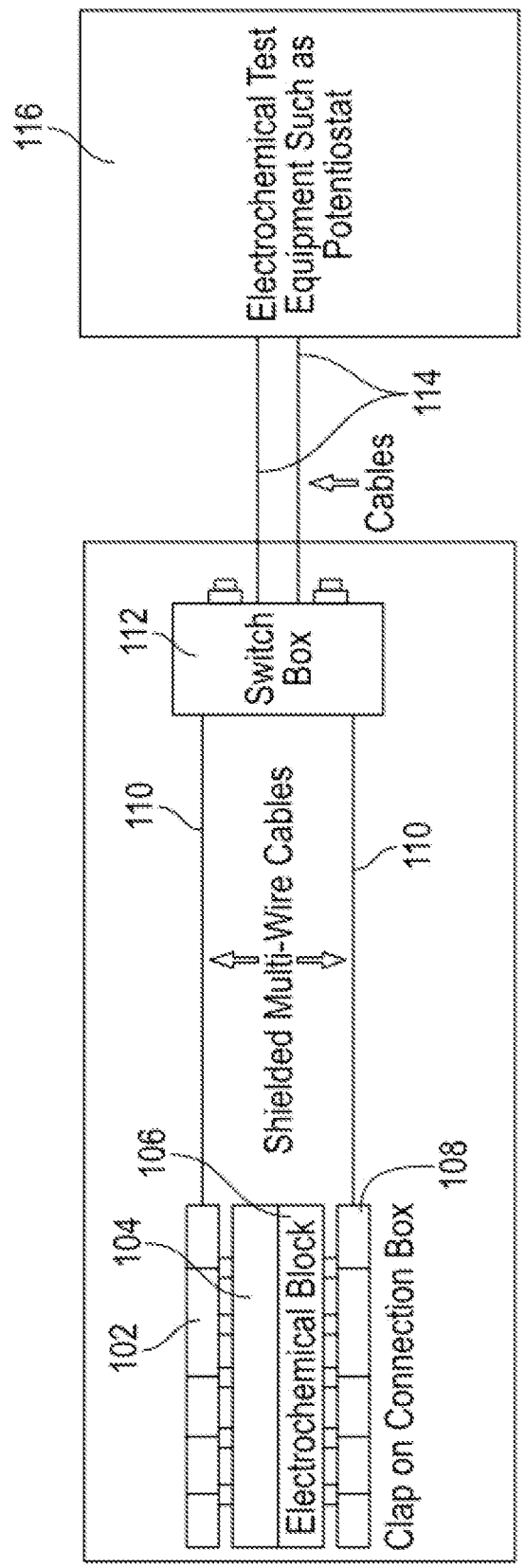
FIG. 1 illustrates an exemplary embodiment of an electrochemical testing system, accordance to some embodiments.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates an exemplary embodiment of an electrochemical testing system, accordance to some embodiments. The illustrated electrochemical testing system includes a multichannel electrochemical formulation and testing module 102 with a top electrochemical block 104 and a bottom electrochemical block 106, a connection box 108, shielded multi-wire cables 110, a switch box 112, cables 114, and electrochemical test equipment 116.

The multichannel electrochemical formulation and testing module 102 includes a top electrochemical block 104 and bottom electrochemical block 106. The electrochemical formulation and testing module has multiple independent channels in an N×M matrix format (e.g., for example, a 2×4 or 4×6 matrix), allowing for N×M receiving wells with material inside of each.

Electrochemical material, each having an electrochemical composition, is inserted into the receiving wells. According to various embodiments, the electrochemical material may be, e.g., one or more of: polymer electrolyte, liquid electrolyte, cathode, anode, or any other suitable electrochemical material. In various embodiments, each electrochemical material represents battery materials for optimizing at least one objective function, such as, for example: conductivity, lithium transference number, lithium diffusion coefficient, cathodic stability, anodic stability, cost, and/or any other suitable or relevant objective function of battery materials. In some embodiments, the system can be potentially used for electrochemical properties for testing beyond battery materials, such as, e.g., low or high dielectric materials or fuel cell materials. One or more measurement tests are performed on each of the electrochemical compositions placed into the N×M receiving wells.

In various embodiments, an electrode can be placed in the top block 104, the bottom block 106, or both. In some embodiments, the top and/or bottom electrodes are made from conductive metals, such as, e.g., copper. In some embodiments, springs are contained inside the assemblies of the formulation and testing module that connect to electrodes in the top block and/or electrodes in the bottom block to ensure an electrical connection is provided, i.e., conductivity of the electrochemical composition with the electrode(s) is insured.

In some embodiments, a vacuum fitting is present in the formulation and testing module, in the top and/or bottom block. In some embodiments, this vacuum fitting can connect to a vacuum machine in order to create a vacuum-sealed environment inside. In some embodiments, the vacuum fitting is a metal hose which is placed at the center of the module, and this hose is used to connect the block to a vacuum pump. In some embodiments, one or more metal screws are present to tighten the assemblies and the electrode(s) within the module, and to provide a surface to make use of the vacuum pump. In various embodiments, a square rim style sealing and/or flat rubber rings are present to ensure the sealing of the inside channels, which creates an air-tight seal between the top block 104 and the bottom block 106.

In some embodiments, the connection box 108 includes clap on fast connection blocks for electrochemical testing. In some embodiments, to ensure a sufficiently fast connection of the electrodes on the top and bottom electrochemical blocks, clap on printed circuit board (hereinafter "PCB") connectors are employed. The PCB connectors include a corresponding number of contact pins (i.e., N×M number of contact pins), with a single output connection port for easy plug-in connection. In some embodiments, a PCB with multiple layers (e.g., 6 layers or more depending on the circuit board design) will be used to ensure that there is no interference between signals from different electrodes.

An automatic switch box 112 is connected to the formulation and testing module 102 via one or more shielded multi-wire cables 110. In some embodiments the switch box 112 includes switching software configured to enable automatic switching between channels for purposes of electrochemical property measurement. In various embodiments, the switch box 112 can allow for, e.g., 4-to-1, 8-to-1, or 32-to-1 input/output correspondence. The automatic switch box 112 enables N×M channels to be measured by electrochemical test equipment 116. In various embodiments, this test equipment 116 can include single-channel or M-channel testing devices, such as, e.g., a potentiostat. The electrochemical test equipment 116 functions to measure properties such as, e.g., conductivities and Electrochemical Impedance Spectroscopy (EIS). In various embodiments, the measurement channel can be automatically switched in various ways, such as by, e.g., a timer, a trigger signal, or a manual process. In some embodiments, the switch box 112 can be controlled via a computer device through, e.g., a serial communication or TCP/IP.

In order to achieve a real battery cell condition, there are multiple critical technical challenges within the system design. These challenges include, at least: a requirement that the module must be air and moisture free; a requirement that the electrodes and the electrolyte materials should be even and well-connected; and a requirement that there is electric insulation between cells. These challenges will be addressed throughout the discussion of the figures below.

Figure 2:
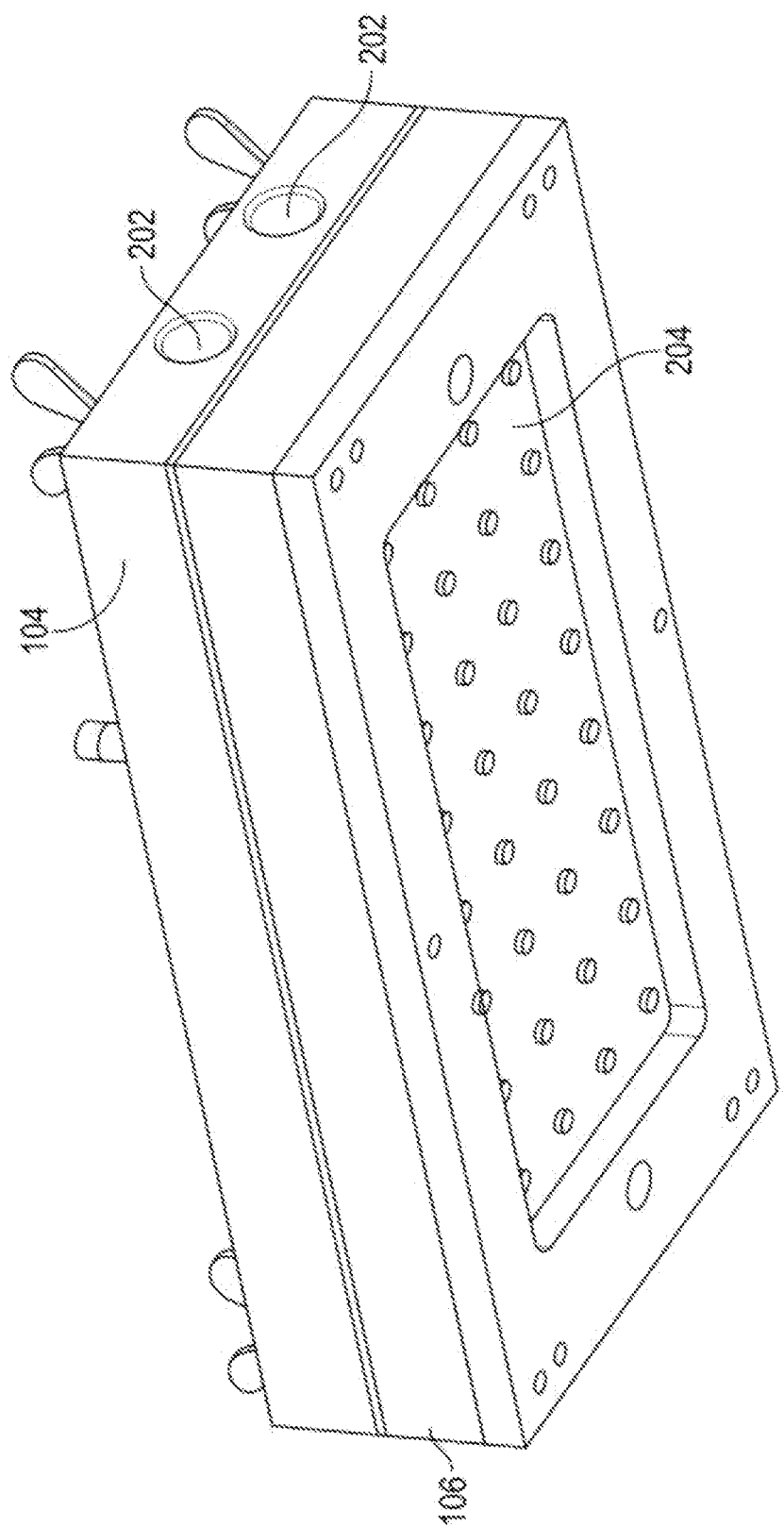
FIG. 2 illustrates an exemplary embodiment of top and bottom electrochemical blocks of an electrochemical module, according to some embodiments.

FIG. 2 illustrates an exemplary embodiment of top and bottom electrochemical blocks of an electrochemical module, according to some embodiments.

Figure 3:
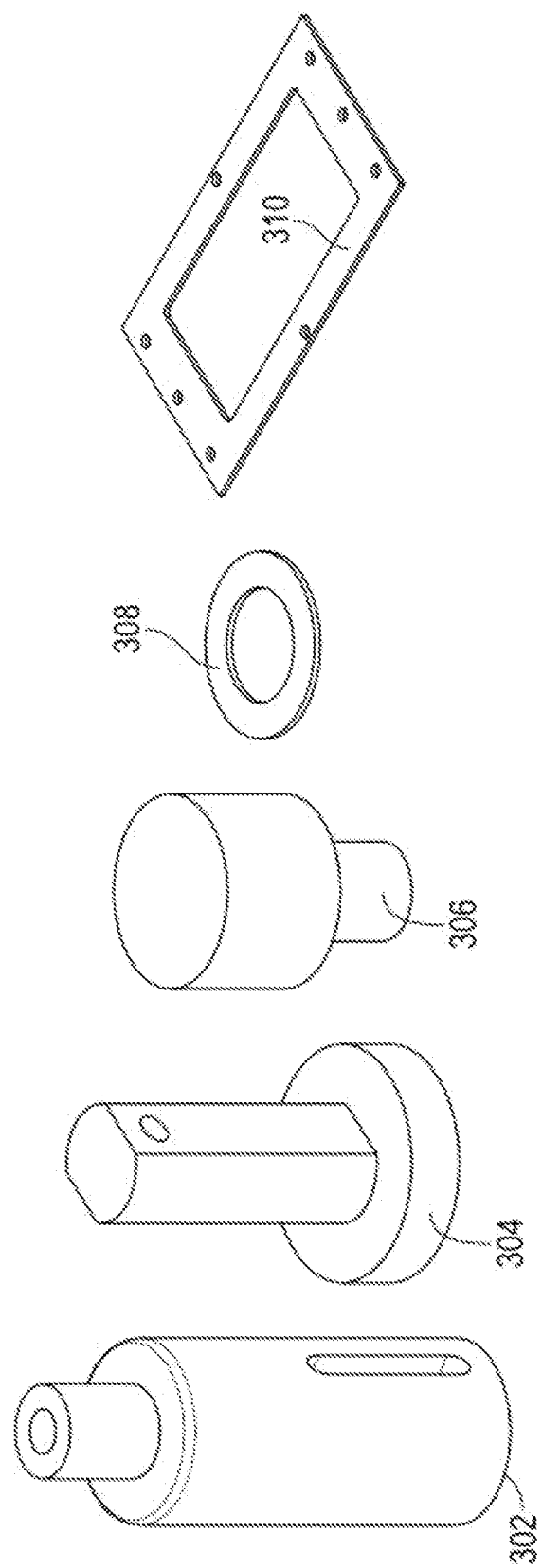
FIG. 3 is a diagram illustrating connecting and sealing components used in various embodiments.

As described above, the electrochemical module 102 is composed of a top electrochemical block 104 and a bottom electrochemical block 106. In some embodiments, these top and bottom blocks are made of Teflon or similar isolating material, to ensure that every channel is properly isolated. The top and bottom blocks each contain N×M number of holes, e.g., 4×8 as illustrated in the figure for 32 channels, with positions well aligned for the top and bottom blocks. In some embodiments, a "T" shaped stainless-steel component, such as, e.g., the T-shaped component 306 in FIG. 3, is inserted into the bottom block 106 to provide one electrode. In some embodiments, a hollow cylindrical fitting component with a sliding hole, such as the cylindrical fitting component 302 in FIG. 3, will be inserted into a hole of the upper block 104. In some embodiments, this component is a hollow and/or stainless-steel piece. In some embodiments, a spring is inserted into the hollow of the cylindrical fitting component, and then a T-shape stainless steel component with a small hole, such as the T shaped component 304 in FIG. 3, is inserted into the hollow of the fitting component 302. The T shaped component 304 is fixed with a small pin inserted into the hole in the "T", as well as the sliding hole in the fitting component 302. In some embodiments, this "T" component 304 acts as another electrode and has an extended up and down range. In some embodiments, the force created by the spring in each cell guarantees a strong surface contact between the electrode(s) and the electrochemical material. In some embodiments, other components such as a washer separator component 308 and/or a sealing component 310 may additionally be present.

The top and bottom electrochemical blocks can be placed together, i.e., one pressed against the other. These top and bottom blocks are sealed tightly. In various embodiments, these blocks are sealed with an air-tight and moisture-free seal. Many methods of sealing may be contemplated. In some embodiments, the seal may be a vacuum-tight seal. In some embodiments, an air valve can be filled with an inert gas or dry material to create the seal. In some embodiments, sealing is facilitated with a gasket seal. In some embodiments, when the top and bottom electrochemical blocks are placed together, the top is tough, so a layer of a sealing component 310, such as, e.g., a sealing rubber, is placed between the top and bottom blocks. The sealing gasket will provide a sealing for the top and bottom blocks.

In some embodiments, a washer separator component in inserted between top and bottom electrodes within the top and bottom electrochemical blocks, such as the washer separator component 308 in FIG. 3. A top electrode by design will be able to come into contact with a bottom electrode to create pressure. A polymer may then be inserted between the top and bottom electrodes for creating a conductivity test. However, if liquid is filled in between, with the top electrode attached to the bottom electrode, the electrodes would be touching with no electrolyte between them. Thus, a washer separator component can be inserted in between, such as, e.g., a round, washer-style separator component with a hole. In some embodiments, liquid electrolyte can then be filled between the top and bottom electrode in the hole. A chamber is thus created which has both a top and bottom electrode, with liquid electrolyte in between. Multiple such chambers can be created corresponding to the number of channels for testing. In some embodiments, the washer separator component is a non-conductive material, such as, e.g., Teflon.

In some embodiments, sealing is facilitated with square rim style sealing between the top and bottom blocks. In some embodiments, sealing can be facilitated with usage of Teflon material combined with screws. In some embodiments, the top electrochemical block has a vacuum fitting, such as an air valve or metal hose, which can connect to a vacuum pump to generate a vacuum environment inside the module. Other forms of sealing the top and bottom blocks may be contemplated.

Figure 4:
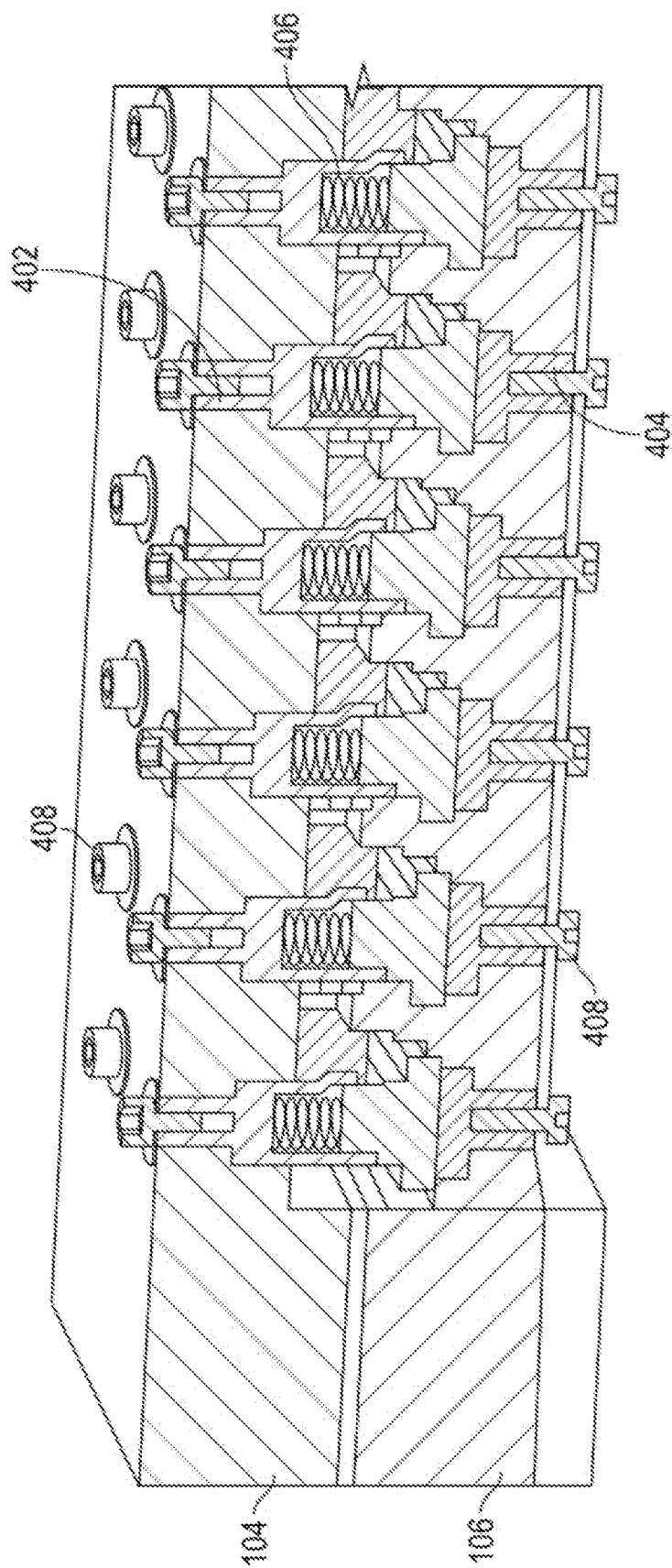
FIG. 4 illustrates an exemplary embodiment of a three-dimensional (hereinafter "3D") drawing of top and bottom electrochemical blocks with a cross-section cut to illustrate when the top and bottom blocks are placed together and sealed, according to some embodiments.

FIG. 4 illustrates an exemplary embodiment of a 3D drawing of top and bottom electrochemical blocks with a cross-section cut to illustrate when the top and bottom blocks are placed together and sealed, according to some embodiments.

For measurement of ionic conductivity, samples of electrochemical material are sandwiched between stainless-steel electrodes. An electrochemical impedance spectrum (EIS) can be collected, from which the ionic conductivity is derived. Since the electrochemical module can have N×M channels, for example, 4×8 or 32 channels, there will be a total of double the channels, e.g., 64 wires needed to be connected. In the example of 32 channels, this amounts to 32 wires in the chambers of the top block 104, and 32 wires in the chambers of the bottom block 106. An easy and secure connection to each channel is provided via clap on connections through a connection box, and each channel is connected to electrochemical test equipment such as, e.g., a potentiostat to ensure fast and reliable measurement.

In the illustrated embodiment, each chamber is shown having a top electrode with spring 406, bottom electrode, and electrolyte. A metal piece connects to a probe, which comes into contact with each metal piece on the top and bottom of the block and connects through a PCB board to the switch box. Electrochemical block screws 408 can be screwed into upper electrode assembly 402 and bottom electrode 404, providing an electrical connection between the top and bottom electrode. In some embodiments, the upper electrode assembly 402 corresponds to the fitting component 302 in FIG. 3. In some embodiments, the bottom electrode 404 corresponds to the T-shaped electrode 306 in FIG. 3. In both such embodiments, a screw can be screwed into the fitting component 302 and the T-shaped electrode 306.

Figure 5B:
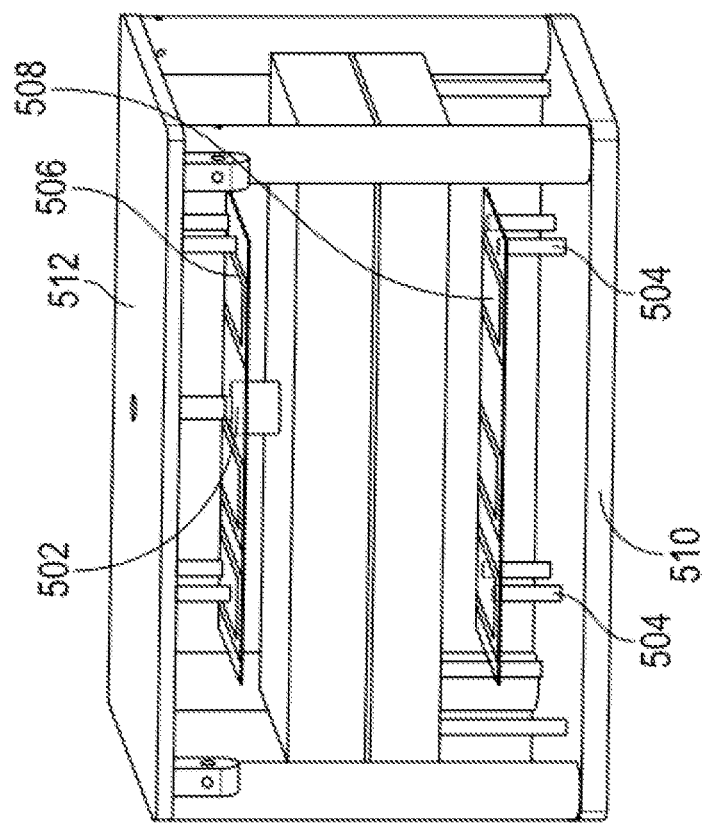
FIG. 5B illustrates an exemplary embodiment of a printed circuit board placed in a connection box with an electrochemical formulation and testing module, according to some embodiments.
Figure 5A:
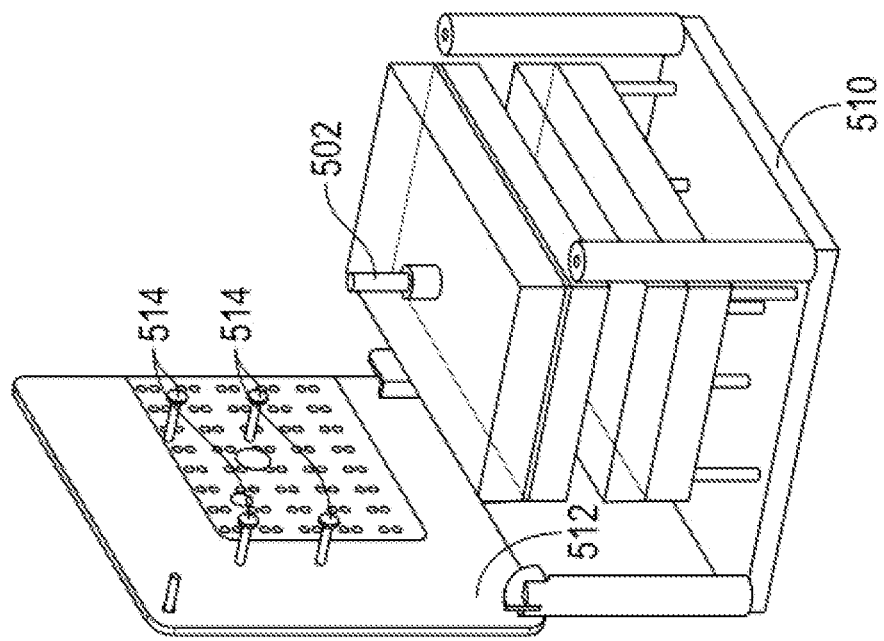
FIG. 5A illustrates an exemplary embodiment of a printed circuit board placed in a connection box with an electrochemical formulation and testing module, according to some embodiments.

FIGS. 5A and 5B illustrate exemplary embodiments of printed circuit boards placed in a connection box with an electrochemical formulation and testing module, according to some embodiments. FIG. 5A illustrates a PCB 506 in the process of being placed in the connection box, while FIG. 5B illustrates the final state of the PCB placed in the connection box. Multilayer PCBs or connections boards 506 and 508, each with N×M connecting points, are configured to exactly match the channel position of the electrochemical module. In some embodiments, the PCBs will each have wires at inner layers, with a ground layer in the middle to prevent signal interference. In some embodiments, the electrochemical module will have an air-tight plug 502 for connecting a vacuum pump. In some embodiments, two boards are used for each electrochemical module, a board for the top block 104 and a board for the bottom block 106. The connection board will have one or more connectors (such as, e.g., DB 9 connector) to facilitate easy plug-in connection of the cables with multiple wires.

In some embodiments, the design can be seen as a holding box which allows for stable and easy connections. A base 510 and a cover 512 for the connection box are shown. One PCB 508 is supported and fixed at the lower part of the box. The electrochemical module can be put in the position inside the box with a matching position. When the cover of the box is closed, the upper PCB board 506 will have its spring plungers pressed, so they will in touch with electrochemical screws on the top of the electrochemical blocks, such as electrochemical block screws 408 in FIG. 4. The same is true for bottom PCB board spring plungers when the electrochemical module is put in place inside the connection box. Supporting screws 514 in the illustration are screws to connect the supporting poles with PCB boards.

Figure 6A:
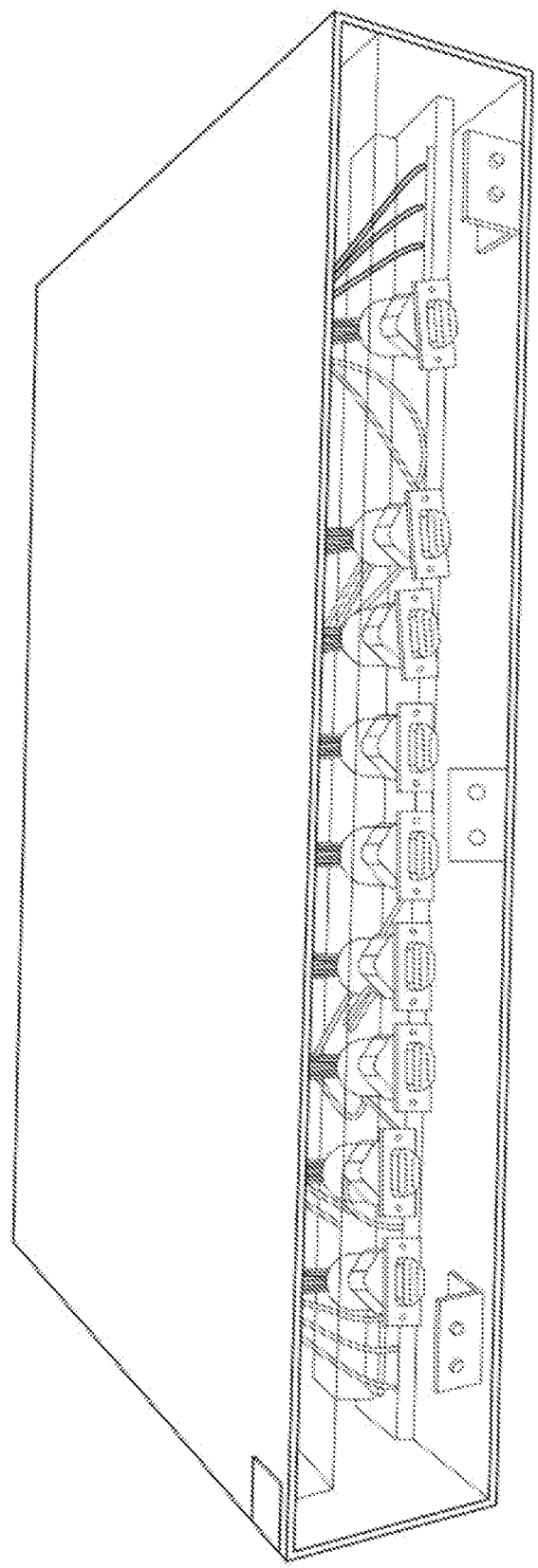
FIG. 6A illustrates an exemplary embodiment of an automatic switch box, according to some embodiments.
Figure 6C:
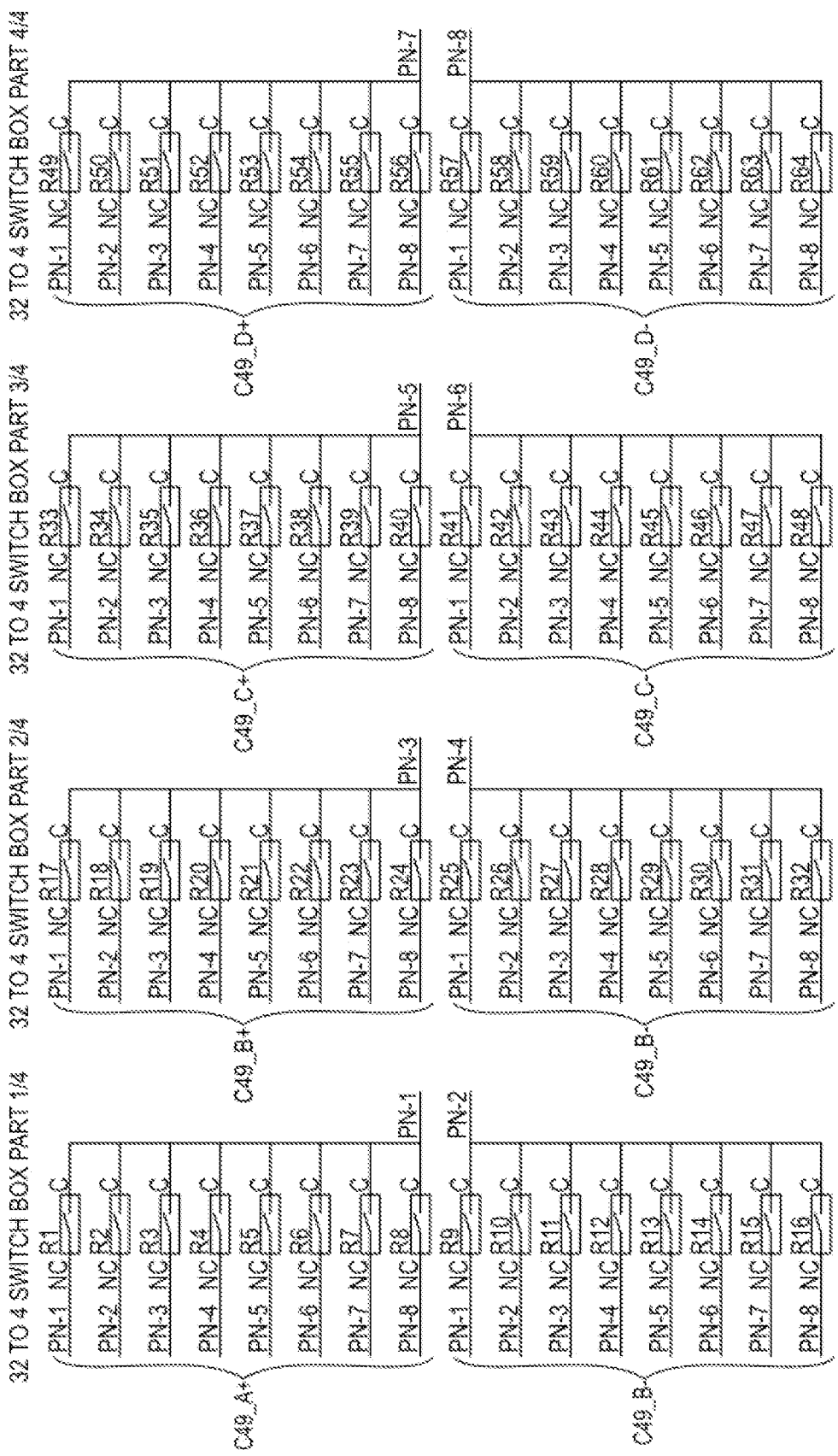
FIG. 6C illustrates a diagram representing an exemplary wiring configuration for an automatic switch box, according to some embodiments.
Figure 6C:
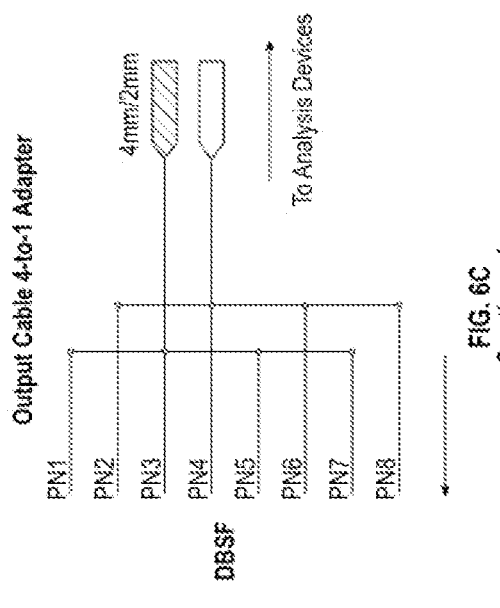

FIGS. 6A, 6B, and 6C illustrate exemplary embodiments of an automatic switch box. FIG. 6A illustrates an exemplary embodiment of an automatic switch box. The electrochemical module 102 can have many channels (e.g., 32 channels), but conventional potentiostats usually have only 1 to 4 channels. In some embodiments, in order to allow the measurement of multiple channels according to a high-throughput measurement process, an automatic channel switch box is included within the electrochemical testing system. In some embodiments, the switch box includes a solid-state relay board with control software. In various embodiments, the switch box channels can be, e.g., manually switched via a click switch button on a graphical user interface ("GUI"); can be configured for automatic channel-switching via a timer; or can be configured for automatic channel switching through one or more software commands.

FIG. 6B illustrates an exemplary embodiment of a control software interface for an automatic switch box. In some embodiments as illustrated, the switch box can be configured by software as 32 inputs (as illustrated, channels 00 through 31) to be routed to 4 outputs. In some embodiments, the switch box can be configured as 32 inputs to 1 output. Many other such switching and routing configurations can be contemplated.

FIG. 6C illustrates a diagram representing an exemplary wiring configuration for an automatic switch box. In the illustrated wiring configuration, a 32-channel automatic switch box is configured. In the top section, 32 inputs are routed to 4 outputs. In the bottom section, 32 inputs are routed to 1 input. In some alternative embodiments, 1 input can be routed to 1 output for either or both sections, i.e., an individual channel can be routed to an individual channel in a 1-to-1 fashion. Various other alternative embodiments with different configuration may be contemplated.

Figure 7A:
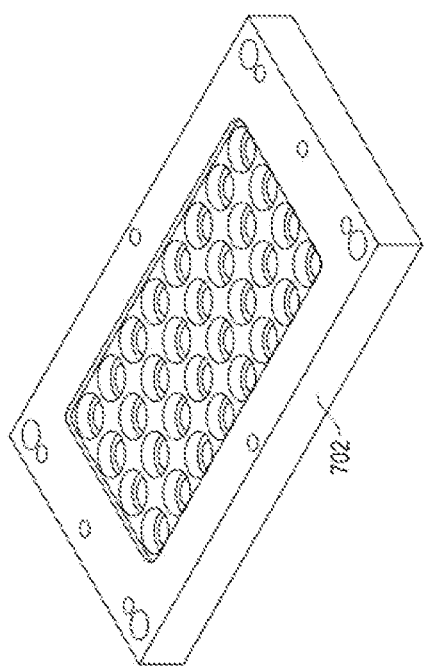
FIG. 7A illustrates a top view of a bottom block, in accordance with some embodiments.

FIG. 7A illustrates a top view of a bottom block 702, wherein the top block can be fastened upon the bottom block 702. When a top block and bottom block are fastened together, an electro-chemical module is created which contains a number of channels, e.g., 32 channels as illustrated in this example. In various embodiments, both the top and lower blocks may be made out of Teflon, to ensure that every channel is isolated, and each can have a number of holes that, when aligned, form the number of channels. For example, 32 holes are present in the example, and when aligned, the holes form the 32 channels. In some embodiments, each channel mimics a battery cell, with anode and cathode connections in the upper and lower block, as well as electrolyte samples sandwiched in between to carry out the charge transport between both electrodes. In the illustrated example, the holes may be configured to have a T-shaped electrode inserted. One example of such a T-shaped electrode is illustrated as the T-shaped component 306 in FIG. 3. It is understood that the electro-chemical module is not limited to 32 channels and may have any number of channels. In some embodiments, a bottom block may include, e.g., 32 wells into which recipe instances prepared by a robotic preparation module may be deposited—as well as an inserted T-shaped electrode component.

In some embodiments, electrochemical materials (e.g., electrolyte) are placed between the top and bottom blocks. Spring assembly allows for conductivity for the electrolyte material, and then measurements are taken.

In some embodiments, automated insertion of electrochemical materials may be performed using a robotics driven system or other form of automation. In some embodiments, the bottom block is placed on a deck of a robot, and a standard electrolyte plate is placed onto the deck of the robot. The robot then is configured to add the electrolyte to each well of the block. In some embodiments, a top block can then be placed down by the robot in order to seal the block.

Figure 7B:
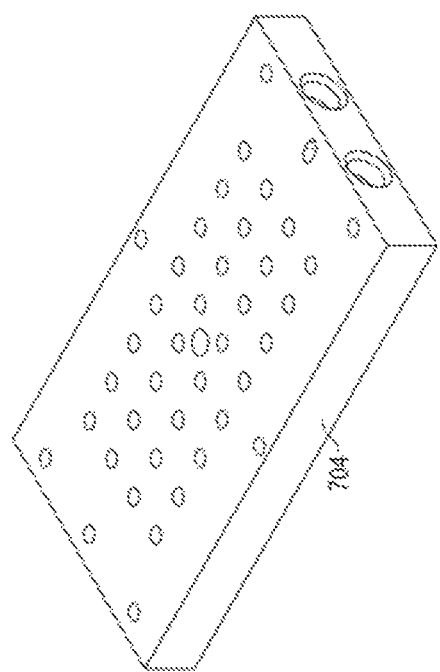
FIG. 7B illustrates a top view of a top block, in accordance with some embodiments.

FIG. 7B illustrates a top view of a top block 702. The top block is configured to be fastened onto the bottom block shown in FIG. 7A.

In some embodiments, a spring is pressed down upon the top and bottom blocks being fastened together. In some embodiments, a glide hole is placed on the assembly. When the spring is extended with some force, the top electrode will come into contact with the bottom electrode, when looking at the top block and bottom block together. This results in a plunger being pushed down when the top block is connected to the bottom block, and this results in a connection being formed from the electrode to the electrolytic material.

Both fastened upper-lower block pairs are situated in a tray. The upper-lower block pairs simulate up to 32 channel battery cells with different recipes prepared and deposited by a robotic preparation module, such that a robotic testing module may perform one or more tests on each channel.

Figure 7C:
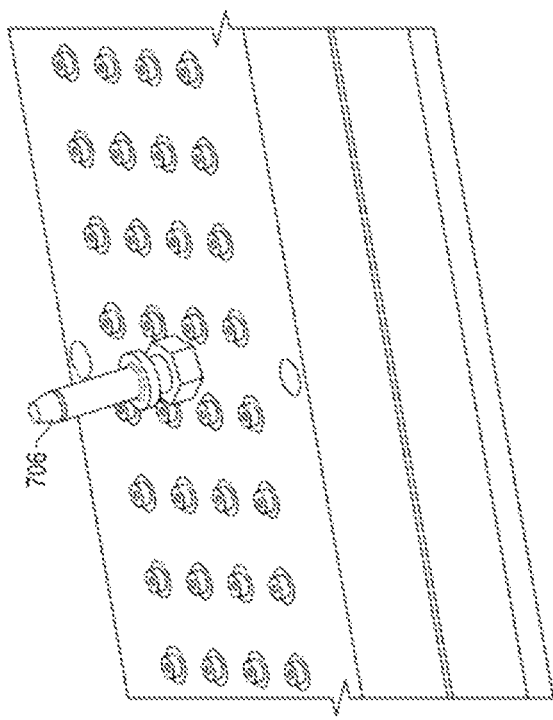
FIG. 7C illustrates a top view of a top and bottom block fastened together, in accordance with some embodiments.

FIG. 7C illustrates a top view of a top and bottom block fastened together. An air-tight plug in the center allows for the connection of a vacuum pump, as described above.

Figure 8B:
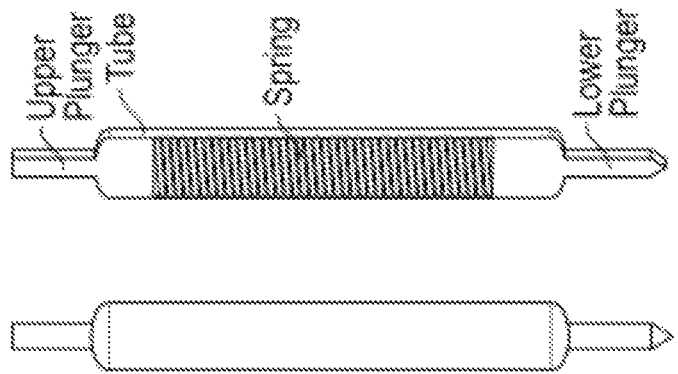
FIG. 8B illustrates a plunger which connects to each of the receiving wells, in accordance with some embodiments.
Figure 8A:
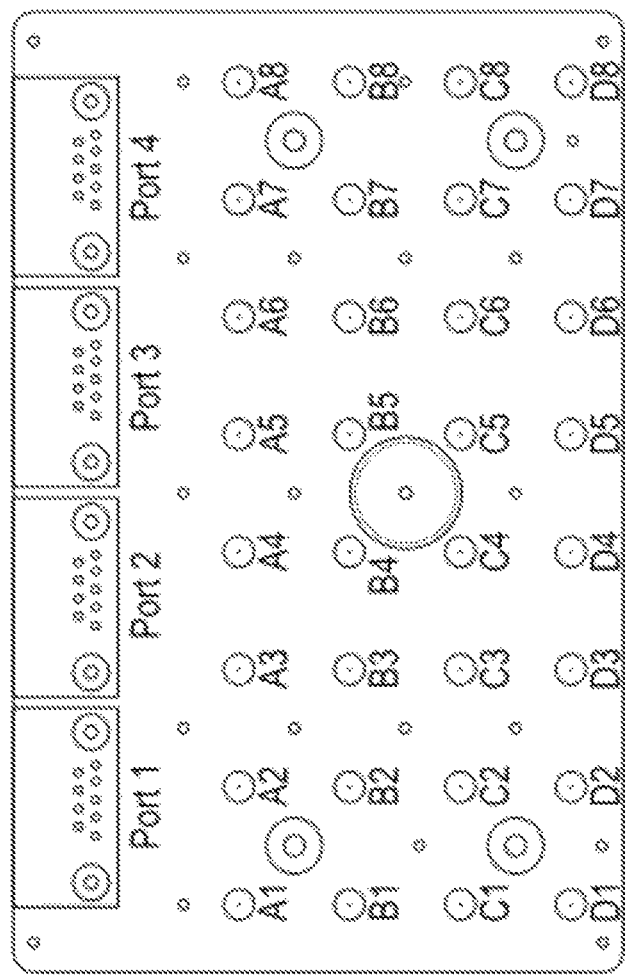
FIG. 8A illustrates a PCB board representing an N×M matrix of testing cells, in accordance with some embodiments.

FIG. 8A illustrates a PCB board representing an N×M matrix of testing cells. In the illustrated example, a 4×8 matrix of 32 testing cells is shown. In addition, in some embodiments, four connection points are provided, each of which is used to affix the PCB board to a pole (e.g., a standoff) attached to a cover for the PCB board. In some embodiments, ports 1, 2, 3, and 4 are present. These ports are lined up with the switch box, which uses DB9 connectors. The ports are configured to exactly match the switch box. As illustrated, each of the four ports has nine connectors. In some embodiments, not all of these connectors are used. For example, eight connectors may be used to represent eight channels coming out of each port, for a total of 32 channels.

FIG. 8B illustrates a plunger which connects to each of the receiving wells. The plunger provides electrical connection, as described above. In differing embodiments, plungers of different sizes may be used. An upper plunger tube, spring, and lower plunger are illustrated on the plunger.

Figure 9:
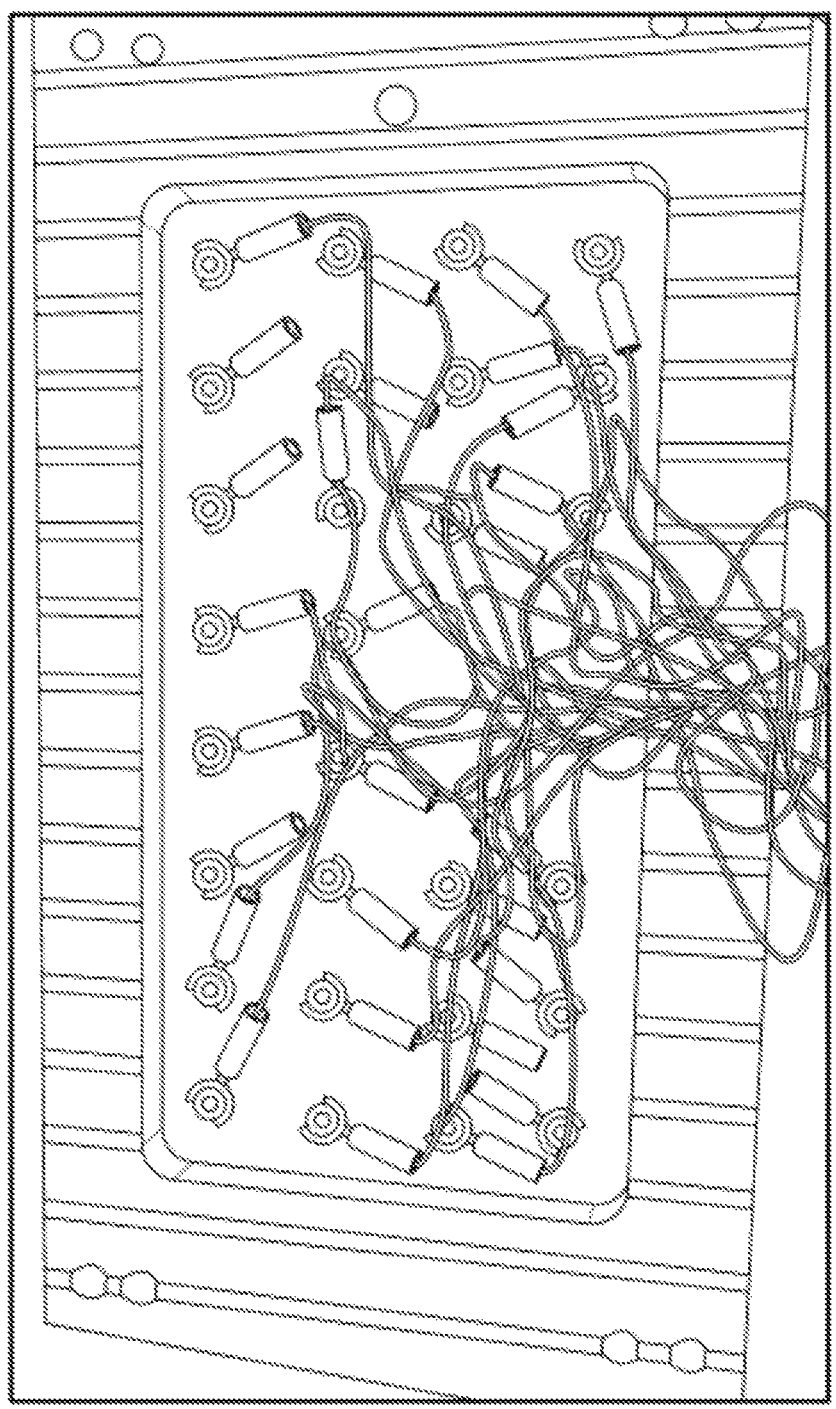
FIG. 9 illustrates a prior art embodiment of a 32-channel electrochemical block with manual connections per channel.

FIG. 9 illustrates a prior art embodiment of a 32-channel electrochemical block, with manual connections per channel. As illustrated, a wire is manually attached to each of the 32 channels, and the wires are connected to a switch box.

Figure 10:
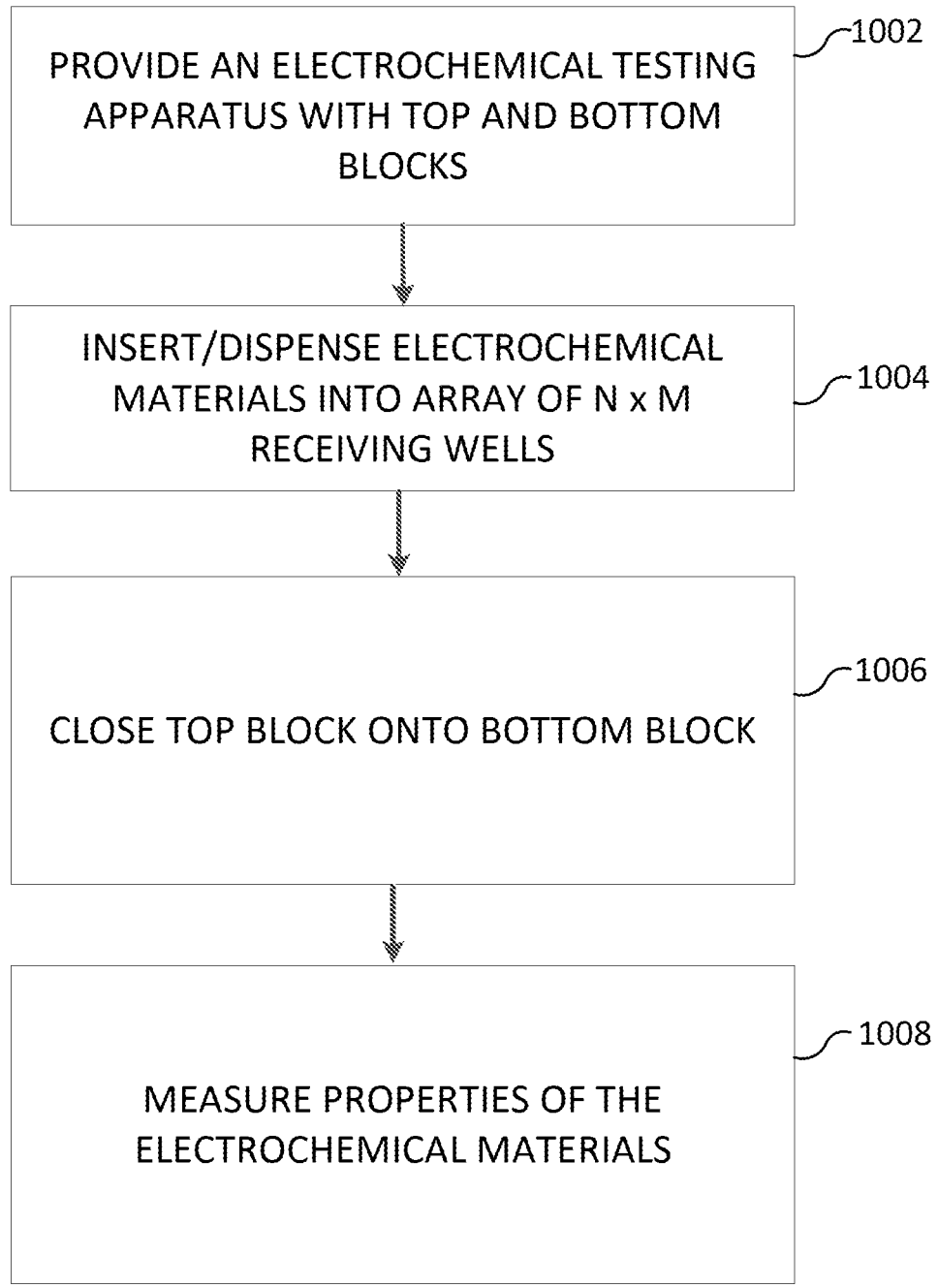
FIG. 10 is a flowchart illustrating an exemplary method for multi-channel matrix-based electrochemical testing, in accordance with some embodiments.

FIG. 10 is a flowchart illustrating an exemplary method for multi-channel matrix-based electrochemical testing, in accordance with some embodiments.

At step 1002, the system provides an electrochemical testing apparatus, i.e., an electrochemical testing module, with top and bottom blocks. The bottom block is an electrochemical block which includes a first array of N×M receiving wells. The top block is an electrochemical block which includes a second array of N×M chambers. Each of the N×M chambers includes an electrical connector inserted into the chamber.

In some embodiments, the electrochemical testing apparatus includes a switch box configured to switch between testing a group of one or more of the N×M testing cells, as described above. In some embodiments, the switch box is configured to automatically switch between the group of the one or more of the N×M testing cells via control software. In other embodiments, the switch box is configured to automatically switch between the group of the one or more of the N×M testing cells via a configurable timer. In other embodiments, the switch box is configured to be manually switched between the group of the one or more of the N×M testing cells via a switch button.

At step 1004, the system inserts electrochemical materials into the first array of N×M receiving wells, as described above. This step involves inserting, into the N×M receiving wells of the bottom block, one or more electrochemical materials to be tested.

In some embodiments, the electrochemical materials are inserted prior to closing the top block onto the bottom block in step 1006. In some embodiments, the bottom block is placed onto the deck of a robot, such as a robot that is configured to operate based on artificial intelligence ("AI") methods, such as machine learning ("ML") or neural network-based AI techniques, e.g., recurrent neural networks and other neural networks.

For example, an electrolyte plate (containing electrolyte as the electrochemical materials to be tested) is placed onto the deck of the robot. In some embodiments, electrolytes to be tested are pre-formulated, while in other embodiments the electrolytes are in-situ formulated by the robot. The robot will facilitate the dispensing of the electrolyte into the N×M receiving wells. Electrolyte is thus added to each well of the block. Once the electrolyte is fully added, then the system can proceed to step 1006.

At step 1006, the system closes the top block onto the bottom block, as described above. This step involves closing or fastening the top electrochemical block onto the bottom electrochemical block. When the top and bottom electrochemical blocks are closed, the N×M receiving wells and N×M chambers are aligned, thereby forming N×M testing cells. Once the top and bottom blocks are fastened together, the electrochemical materials are present between the top and bottom blocks, within the testing cells.

In some embodiments, before closing the top electrochemical block onto the bottom electrochemical block, the system inserts a bottom electrode device into each of the receiving wells to be tested, and inserts a top electrode device into each of the corresponding chambers. The top and bottom electrode devices are configured to connect with each other when the top electrochemical block is closed onto the bottom electrochemical block. In some embodiments, a washer separator component is inserted for liquid electrolyte measurement.

In some embodiments, a spring assembly allows for conductivity for the electrochemical materials, which allows the electrochemical materials to be measured with respect to one or more properties as in step 1008 below. In some embodiments, the spring assembly is made of metallic material in order to provide conductivity. In some embodiments, the material is highly conductive material, such as, e.g., copper. The spring is pressed down when the top block is closed onto the bottom block. In some embodiments, a glide hole is present on the spring assembly. When the spring is extended with some force, the top electrode will come into contact with the bottom electrochemical material (e.g., electrolyte or other suitable electrochemical material). The plunger is pushed down during the connecting of the top block to the bottom block. This pushing down of the plunger presses the electrochemical material down against the electrode, and this is what forms the connection of the electrode to the electrochemical material.

In some embodiments, a sterile, clean environment (e.g., at laboratory clean standards) is present or generated. This can include the electrochemical module being operated in an air-free and moisture-free environment. In some embodiments, after closing the top block onto the bottom block but prior to measuring the properties of electrochemical materials in step 1008, the system evacuates air from the internal channels and the top and bottom electrochemical blocks using a vacuum source, in order to provide a vacuum-tight seal between the top and bottom blocks. In some embodiments, a socket is used to connect the electrochemical module to a vacuum in order to create the vacuum-sealed environment. In some embodiments, a metal hose is attached at the center of the top and/or bottom blocks, and this is where the block(s) are connected to a vacuum pump. In some embodiments, a metal screw is present which will tighten the spring assembly and electrodes. In some embodiments, when the top and bottom blocks are closed together, the inside will form a chamber that is vacuum-tight and moisture-free. In some embodiments, air may be captured within this chamber. In some embodiments, another hole may be present on the module (e.g., on one or both blocks) which provides the vacuum chamber, for the entire multi-channel environment. In some embodiments, this hole is sealed via O-ring or other supporter. In some embodiments, channels are sealed individually by O-rings or other supporters. In some embodiments, an O-ring or other supporter may also be added to provide space between the top and bottom block, and the vacuum environment is generated afterward. The O-rings or other supporters used in these embodiments can provide a common space for all channels within the blocks by creating a middle layer of support between the top and bottom layers.

In one example, there are multiple channels and multiple receiving wells, and an entire chamber formed from the top and bottom blocks is vacuum sealed to remove air. In some embodiments, there is no cross-sharing of air between the channels. In some embodiments, the receiving wells can each be individually sealed.

In some embodiments, the system provides a gasket seal between the top and bottom electrochemical block. In some embodiments, the system affixes the top electrochemical block to the bottom electrochemical block using one or more fasteners. In some embodiments, an O-ring is used to facilitate the sealing, as described above.

In some embodiments, the system provides a seal between the top and bottom electrochemical blocks via an air valve filled with an inert gas or dry material.

In some embodiments, a connection box as described above provides connection to measuring equipment for all 32 channels and consists of a number of channels with the same number of wires on top and on the bottom of the connection box (e.g., 32 channels in a multichannel case, with 32 wires on top and 32 wires on bottom). In some embodiments, a cable is connected to the connection box, and then extended to a switch box.

At step 1008, the system measures the electrochemical materials inserted in the N×M receiving wells, as described above. This step involves measuring one or more properties of the electrochemical materials inserted into the N×M receiving wells. In various embodiments, this testing and measurement may be performed manually, automatically, or semi-automatically. In some embodiments, testing is performed automatically by an AI-based robotics driven system. In some embodiments, this system includes one or more of a machine learning framework, a knowledge database that includes training data, a robotic preparation module, and a robotic testing module. Various embodiments of this robotics driven system can be centralized, autonomous, combinatorial, and closed-loop, and can combine machine learning and robotic high-throughput automation. In some embodiments, this system can be implemented to discover new high-performance battery materials and improve existing battery materials, including one or more recipe components for the electrolyte (polymer/liquid), the cathode and the anode, as well as battery devices. In other embodiments, this system can be implemented to discover high-performance non-battery materials as well, including for use in, e.g., capacitors, super capacitors, ceramic electrolytes, dielectric material, or any other suitable electrochemical materials to be used in non-battery contexts.

In some embodiments, the robotics driven system generates, via the machine learning model, a number of proposed different recipes of battery materials, optimizing for at least one objective function. Instances of the different recipes of battery materials are prepared and deposited into an electrochemical module by a robotic preparation module. A robotic testing module executes a plurality of formulation characteristic tests on each deposited recipe instance and updates the machine learning model with a result of at least one of the formulation characteristic tests.

Further description, embodiments, and examples of such an AI-based, robotics driven system is disclosed in patent application Ser. No. 63/040,133, entitled, "Materials Artificial Intelligence Robotics-Driven Methods and Systems", which is hereby incorporated by reference in its entirety.

Figure 11:
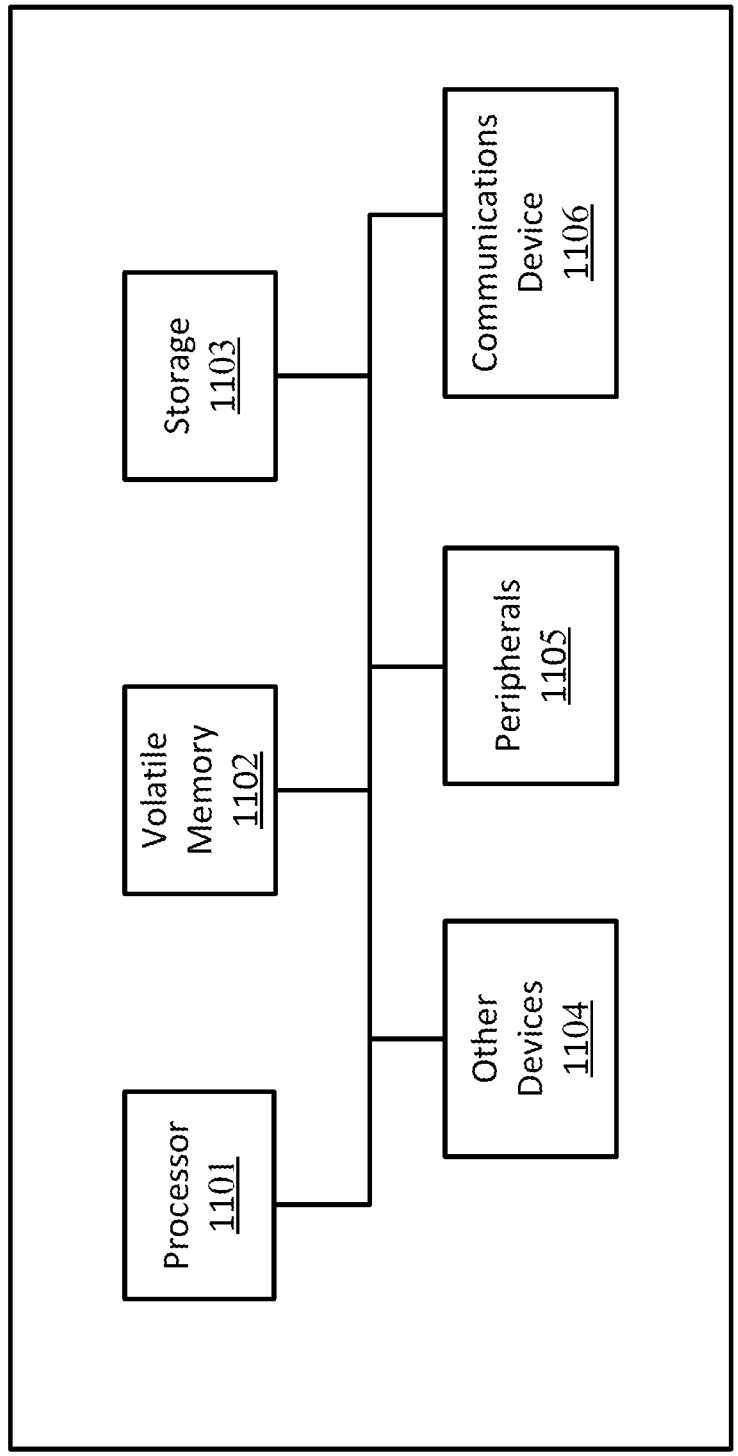
FIG. 11 is a diagram illustrating an exemplary computer that may perform processing in some embodiments.

FIG. 11 is a diagram illustrating an exemplary computer that may perform processing in some embodiments. Exemplary computer 1100 may perform operations consistent with some embodiments. The architecture of computer 1100 is exemplary. Computers can be implemented in a variety of other ways. A wide variety of computers can be used in accordance with the embodiments herein.

Processor 1101 may perform computing functions such as running computer programs. The volatile memory 1102 may provide temporary storage of data for the processor 1101. RAM is one kind of volatile memory. Volatile memory typically requires power to maintain its stored information. Storage 1103 provides computer storage for data, instructions, and/or arbitrary information. Non-volatile memory, which can preserve data even when not powered and including disks and flash memory, is an example of storage. Storage 1103 may be organized as a file system, database, or in other ways. Data, instructions, and information may be loaded from storage 1103 into volatile memory 1102 for processing by the processor 1101.

The computer 1100 may include peripherals 1105. Peripherals 1105 may include input peripherals such as a keyboard, mouse, trackball, video camera, microphone, and other input devices. Peripherals 1105 may also include output devices such as a display. Peripherals 1105 may include removable media devices such as CD-R and DVD-R recorders/players. Communications device 1106 may connect the computer 100 to an external medium. For example, communications device 1106 may take the form of a network adapter that provides communications to a network. A computer 1100 may also include a variety of other devices 1104. The various components of the computer 1100 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein. The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read-only memory ("ROM"), random access memory ("RAM"), magnetic disk storage media, optical storage media, flash memory devices, etc. In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for electrochemical testing, the method comprising:
providing an electrochemical testing apparatus comprising:
a bottom electrochemical block comprising a first array of N×M receiving wells; and
a top electrochemical block comprising a second array of N×M chambers, each of the N×M chambers comprising a top electrode and a bottom electrode, and a spring positioned between the top electrode and the bottom electrode, wherein the bottom electrochemical block includes internal channels interconnected to the first array of N×M receiving wells;
inserting, into a plurality of the first array of the N×M receiving wells, one or more electrochemical materials to be tested;
closing the top electrochemical block onto the bottom electrochemical block, wherein when the top and bottom electrochemical blocks are closed, the N×M receiving wells and N×M chambers are aligned thereby forming N×M testing cells;
measuring one or more properties of the electrochemical materials inserted into the plurality of the N×M receiving wells; and
prior to measuring the one or more properties of the electrochemical materials, evacuating air from the internal channels and the top and bottom electrochemical blocks using a vacuum source.

2. The method of claim 1, further comprising:
providing a gasket seal between the top and bottom electrochemical blocks; and
affixing the top electrochemical block to the bottom electrochemical block using one or more fasteners.

3. The method of claim 1, further comprising:
providing a seal between the top and bottom electrochemical blocks via an air valve filled with an inert gas or dry material.

4. The method of claim 3, further comprising:
upon providing the seal between the top and bottom electrochemical blocks, inserting a washer separator for liquid electrolyte to fill a chamber between a top electrode device and a bottom electrode device, wherein the top electrode device and the bottom electrode device are configured to not connect with each other directly when the top electrochemical block is closed on the bottom electrochemical block.

5. The method of claim 4, wherein the switch box is configured to automatically switch between the group of the one or more of the N×M testing cells via control software.

6. The method of claim 4, wherein the switch box is configured to automatically switch between the group of the one or more of the N×M testing cells via a configurable timer.

7. The method of claim 4, wherein the switch box is configured to be manually switched between the group of the one or more of the N×M testing cells via a switch button.

8. The method of claim 1, further comprising:
before closing the top electrochemical block onto the bottom electrochemical block, inserting into each of the receiving wells to be tested a bottom electrode device, and inserting into each of corresponding chambers a top electrode device, the top and bottom electrode devices configured to connect with each other when the top electrochemical block is closed on the bottom electrochemical block.

9. The method of claim 1, wherein the electrochemical materials are placed into an integrated connection box, the integrated connection box comprising a plurality of microlayers configured to avoid interference between different channels.

10. The method of claim 1, wherein the electrochemical testing apparatus further comprises:
an upper board comprising a first plurality of spring plungers; and
a lower board comprising a second plurality of spring plungers.

11. The method of claim 1, the top electrode comprises a slidable component positioned in contact with the spring.

12. An electrochemical testing apparatus, comprising;
a bottom electrochemical block comprising a first array of N×M receiving wells comprising electrochemical materials;
a top electrochemical block comprising a second array of N×M of chambers, each of the N×M chambers comprising a top electrode and a bottom electrode, and a spring positioned between the top electrode and the bottom electrode;
a gasket seal disposed between the top and bottom electrochemical blocks; and
a switch box configured to switch between testing a group of one or more of the N×M testing cells;
wherein the bottom electrochemical block includes internal channels interconnected to the first array of N×M receiving wells, the internal channels connected to a port for connecting a vacuum source, and wherein when the top and bottom electrochemical blocks are closed, the N×M receiving wells and N×M chambers are aligned to form N×M testing cells.

13. The electrochemical testing apparatus of claim 12, wherein the top electrode comprises a slidable component positioned in contact with the spring.

14. The electrochemical testing apparatus of claim 12, further comprising:
an upper board comprising a first plurality of spring plungers; and
a lower board comprising a second plurality of spring plungers.

15. A communication system comprising one or more processors configured to perform the operations of:
providing an electrochemical testing apparatus, comprising:
a bottom electrochemical block comprising a first array of N×M receiving wells, and
a top electrochemical block comprising a second array of N×M chambers, each of the N×M chambers having a top electrode and a bottom electrode, and a spring positioned between the top electrode and the bottom electrode;
inserting, into a plurality of the first array of the N×M receiving wells, one or more electrochemical materials to be tested;
closing the top electrochemical block onto the bottom electrochemical block, wherein when the top and bottom electrochemical blocks are closed, the N×M receiving wells and N×M chambers are aligned thereby forming N×M testing cells;
measuring one or more properties of the electrochemical materials inserted into the plurality of the N×M receiving wells;
evacuating air from the internal channels and the receiving and top electrochemical blocks using a vacuum source; and
before closing the top electrochemical block onto the bottom electrochemical block, inserting into each of the receiving wells to be tested a removeable bottom electrode device, and inserting into each of corresponding chambers a removeable top electrode device, the top and bottom electrode devices configured to connect with each other when the top electrochemical block is closed on the bottom electrochemical block;
wherein the electrochemical testing apparatus includes a switch box configured to switch between testing a group of one or more of the N×M testing cells; and
wherein the bottom electrochemical block includes internal channels interconnected to the first array of N×M receiving wells.

16. The system of claim 15, further comprising:
an upper board comprising a first plurality of spring plungers; and
a lower board comprising a second plurality of spring plungers.

17. A method for electrochemical testing, the method comprising:
providing an electrochemical testing apparatus comprising:
a bottom electrochemical block comprising a first array of N×M receiving wells; and
a top electrochemical block comprising a second array of N×M chambers, each of the N×M chambers comprising a top electrode and a bottom electrode, and a spring positioned between the top electrode and the bottom electrode;
inserting, into a plurality of the first array of the N×M receiving wells, one or more electrochemical materials to be tested;
closing the top electrochemical block onto the bottom electrochemical block, wherein when the top and bottom electrochemical blocks are closed, the N×M receiving wells and N×M chambers are aligned thereby forming N×M testing cells;
measuring one or more properties of the electrochemical materials inserted into the plurality of the N×M receiving wells;
providing a seal between the top and bottom electrochemical blocks via an air valve filled with an inert gas or dry material; and
upon providing the seal between the top and bottom electrochemical blocks, inserting a washer separator for liquid electrolyte to fill a chamber between a top electrode device and a bottom electrode device, wherein the top electrode device and the bottom electrode device are configured to not connect with each other directly when the top electrochemical block is closed on the bottom electrochemical block.

* * * * *